United States Patent [19]
Jenkins, Sr. et al.

[11] 3,740,047
[45] June 19, 1973

[54] METHOD AND APPARATUS FOR BUILDING CARD SCREENS

[75] Inventors: Robert B. Jenkins, Sr.; Robert B. Jenkins, Jr., both of Gastonia, N.C.

[73] Assignee: Jenkins Metals Shops, Inc., Gastonia, N.C.

[22] Filed: Dec. 28, 1970

[21] Appl. No.: 102,073

Related U.S. Application Data

[62] Division of Ser. No. 752,091, July 11, 1968, Pat. No. 3,568,289.

[52] U.S. Cl. ................................. 269/40, 269/44
[51] Int. Cl. ............................................. B25b 1/20
[58] Field of Search .................... 19/95; 29/200 J, 29/200 P; 269/40, 44, 223, 237, 243, 321 F, 321 S, 321 W

[56] References Cited
UNITED STATES PATENTS

| | | | |
|---|---|---|---|
| 656,871 | 8/1900 | White | 19/95 |
| 117,383 | 7/1871 | Church | 269/44 |
| 1,709,128 | 4/1929 | Gurian | 269/237 X |
| 2,348,920 | 5/1944 | Ott | 269/40 |
| 2,429,109 | 10/1947 | Roach | 269/40 |
| 2,505,105 | 4/1950 | Evans | 269/243 X |
| 2,513,800 | 7/1950 | Hendrick | 269/243 X |
| 506,431 | 10/1893 | Henshaw | 269/44 |
| 2,821,778 | 2/1958 | Wilkin | 269/40 |

*Primary Examiner*—Granville Y. Custer, Jr.
*Attorney*—Hunt, Heard & Rhodes

[57] ABSTRACT

This invention relates to the manufacture of card screens, and more particularly to apparatus for fabricating sub-assemblies which are united in an assembled screen.

4 Claims, 5 Drawing Figures

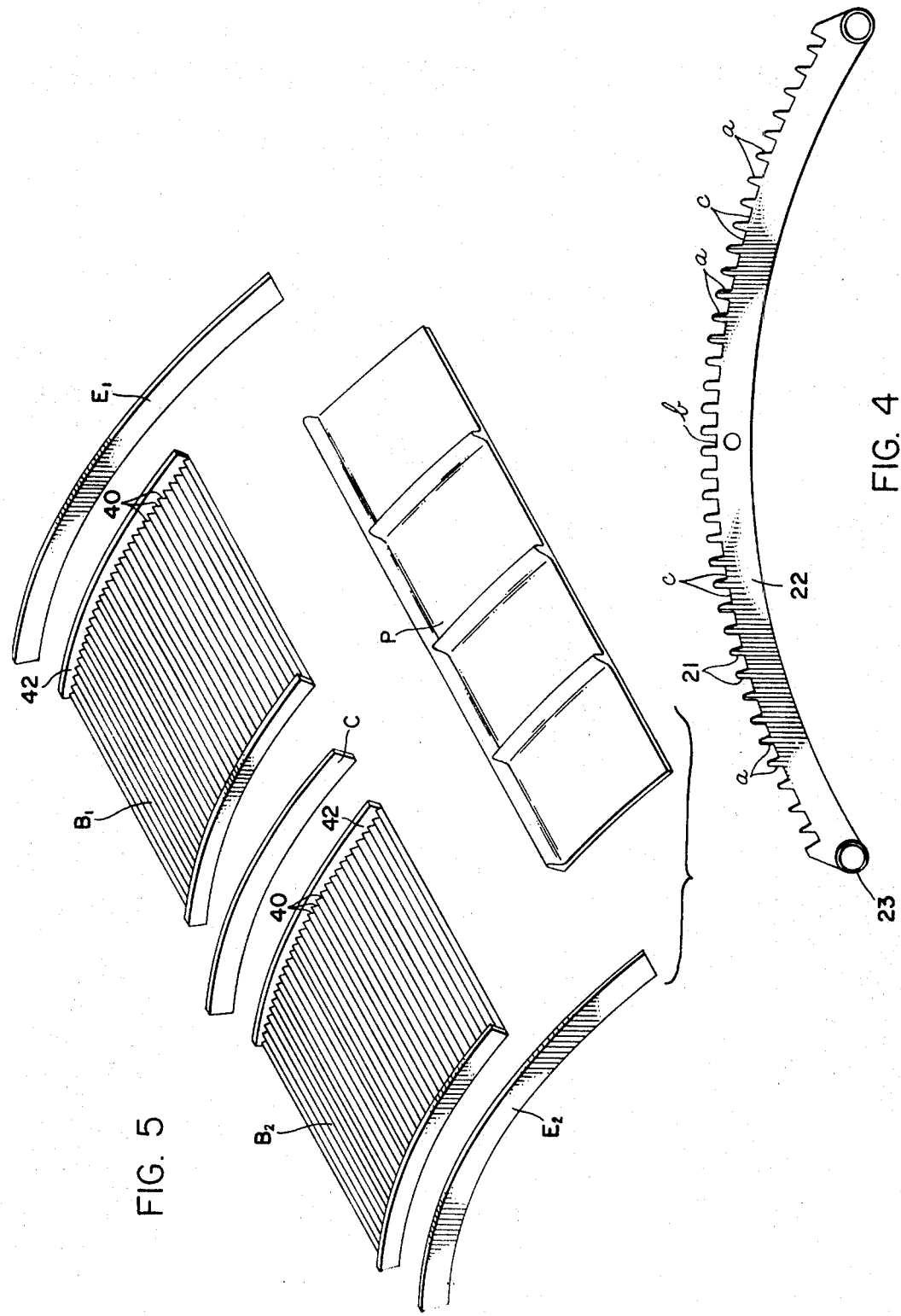

METHOD AND APPARATUS FOR BUILDING CARD SCREENS

CROSS-REFERENCE TO RELATED APPLICATIONS

This application is a division of applicant's copending application, Ser. No. 752,091, filed July 11, 1968, entitled METHOD AND APPARATUS FOR BUILDING CARD SCREENS, now U.S. Pat. No. 3,568,289, issued Mar. 9, 1971.

BACKGROUND OF THE INVENTION

Conventional screens for carding machines comprise a plurality of transversely extending bars secured in parallel relation to one another in a curved frame and positioned adjacent the lower periphery of the main cylinder of the carding machine. The bars may be of uniform cross-section throughout their length, or they may be tapered as described in U.S. Pat. No. 3,348,268 to Jenkins, and this invention is contemplated for use with either type screen.

During the fabrication of the screens, it is conventional in the industry today, to clamp the screen bars and the front plates in abutting relationship between the side ribs and center rib, and then tack or fillet weld the ends of the bars and the edges of the front plates to the ribs. Since a considerable amount of welding or soldering on the relatively thin material comprising the side and center ribs is required, the heat from the excessive welding causes tremendous stresses in the frame which distort the shape of the screen, resulting in a significant loss of time in straightening the screen before it can be used. Moreover, the excessive solder must be sanded or otherwise removed from the ribs and outer surfaces of the screen.

The purpose of the present invention is to alleviate this problem somewhat by first fabricating the several sub-assemblies making up the screen, then riveting or spot-welding the sub-assemblies together to form the finished card screen. Some straightening or sanding is still required on the bar sub-assemblies, however these sub-assemblies are smaller and can be cleaned and straightened much more quickly, with the result that the total fabrication time per screen may be reduced significantly.

It is therefore an object of this invention to provide a method for manufacturing card screens whereby costly straightening and sanding operations may be substantially reduced.

It is another object of this invention to provide a method for manufacturing card screens whereby a screen of higher quality than before can be produced.

It is yet another object of this invention to provide a method for manufacturing card screens whereby repairs to the screen are easier and more economical than in screens manufactured according to prior techniques.

It is a further object of this invention to provide a manufacturing process in which several smaller sub-assemblies are secured together to form a completed card screen, whereby the sanding and straightening operations are performed on the smaller sub-assemblies, rather than on the complete screen assembly.

It is a still further and more specific object of this invention to provide a process for manufacturing a card screen whereby a plurality of bars are secured to a pair of end walls in a preliminary operation forming a sub-assembly which is subsequently joined to the front plates and side ribs and secured together in a suitable manner such as by spot-welding or riveting to form the card screen.

It is still a further object of this invention to provide a jig peculiarly adapted to fabricate the bar sub-assembly described above.

Other objects and a fuller understanding of the invention may be obtained by the following description in connection with the accompanying drawings, in which:

FIG. 4 is a side elevation of the jig divider bar taken substantially along the lines 4—4 in FIG. 2, and FIG. 5 is an exploded perspective view, looking at the bottom of a card screen formed according to the invention.

Figure 1:
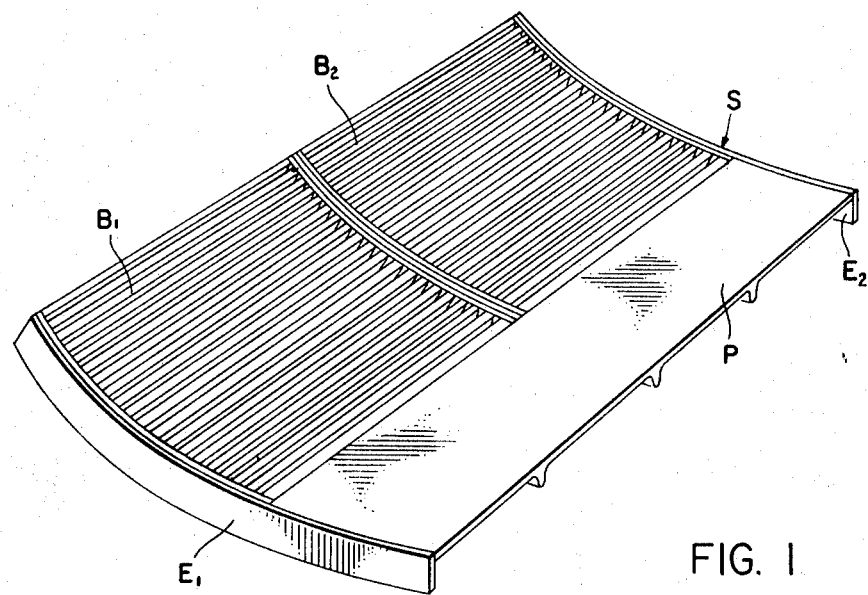
FIG. 1 is a perspective view, looking at the top of a card screen formed according to the invention.

Referring now more particularly to the drawings, a card screen S assembled according to the invention and comprising bar sub-assemblies $B_1$ and $B_2$, front plate P, side ribs $E_1$ and $E_2$, and center rib C is shown in FIG. 1. The sub-assemblies are spot welded or riveted to side ribs $E_1$ and $E_2$ and center rib C, thus eliminating the warping and excessive weld material on the exterior surfaces.

Figure 2:
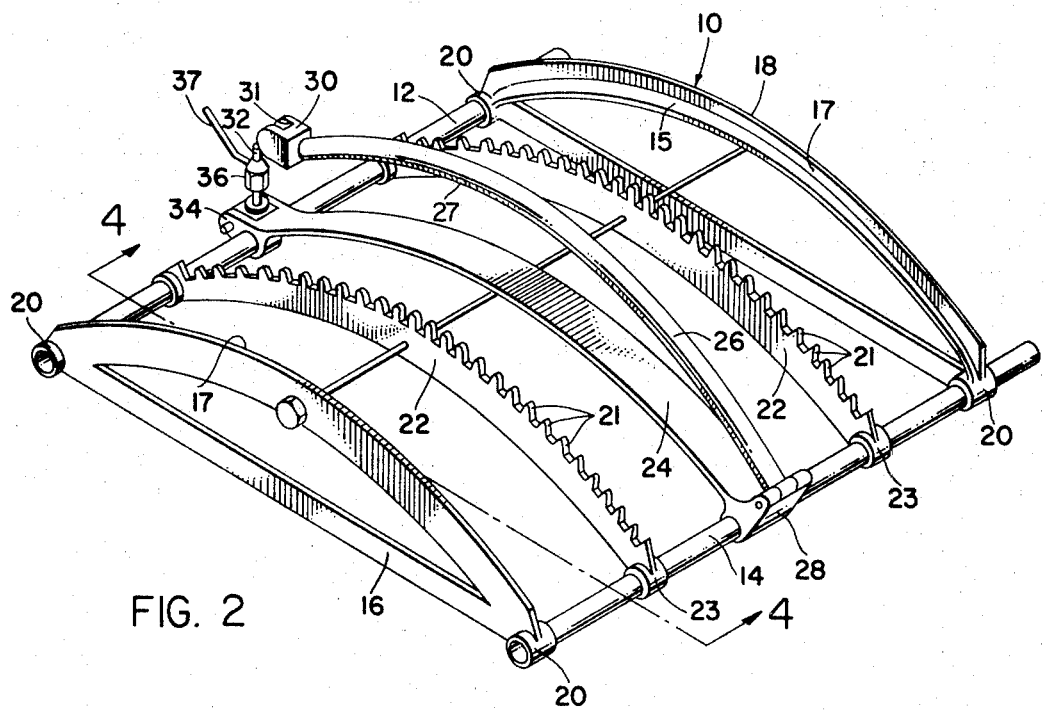
FIG. 2 is a perspective view of the jig for forming the bar sub-assembly according to the present invention.

The jig 10 for fabricating the bar sub-assemblies $B_1$ and $B_2$ is shown in FIG. 2 and comprises a pair of spaced parallel rod members 12 and 14 which support a series of transverse members therebetween. A pair of angular end members 16 and 18 comprising vertical sides 17 and horizontal ledges 15 are attached at spaced intervals along rod members 12 and 14 and bridge the space between said rod members 12 and 14 in a curved path approximately equal to the curve in the card screen S. The distance between the end members 16 and 18 is determined by the length of the bars in sub-assemblies $B_1$ or $B_2$. Each of end members 16 and 18 is attached to rods 12 and 14 by means of a tubular sleeve 20 secured by a set screw to said end pieces at each end thereof, and is adjustable along rods 12 and 14. The horizontal ledge 15 of each end member 16 and 18 serves to support one end of the bars 40 of said sub-assembly $B_1$ or $B_2$ and to retain said bars in close proximity to the end walls 42 during the welding operation.

Spaced inwardly from each of end members 16 and 18 is a pair of curved spacer or divider arms 22 having a series of upstanding teeth 23 along the upper edge thereof, providing a means for spacing the bars 40 of the sub-assembly $B_1$ or $B_2$ a prescribed distance from each other preparatory to the welding operation. A tubular sleeve 23, similar to sleeve 20, is provided at each end of said spacer arms 22 for positioning the spacer arms at prescribed locations along the rods 12 and 14.

A central span 24 is attached midway between end members 16 and 18 and includes an upper bearing band 26 hingedly attached at one end of span 24 as by hinged sleeve 28 which also provides a means for attaching central span 20 to rod 14. The other end of hinged upper band 26 terminates in a coupling 30 having an outwardly facing slot 31 providing a means for securing said bearing band 26 in its closed position.

Central span 24 is attached to the rod 12 by a second hinged sleeve 34 which includes an upstanding threaded stud 32 hinged to the outer portion of said sleeve 34. Internally threaded fastening nut 36 having arm 37 extending perpendicularly therefrom is adapted to bear against the upper surface of slotted coupling 30 and urge hinged band 26 into bearing relationship with the bars 40 positioned in the jig to securely retain them in place during the welding operation. Hinged bearing band 26 also includes a pad 27 of felt or other resilient material attached to the underside thereof to protect the bars from damage and to allow for more uniform pressure on the bars. The securing means described above is merely one example of a satisfactory means for urging the bearing band down onto the bars 40, and any means for accomplishing the same effect is to be considered within the scope of this invention.

Cross members 16, 18, 22, and 24 are all adjustable along the length of rods 12 and 14, so that the jig is adapted to receive various lengths of bars 40 for various sizes of sub-assemblies.

Spacer arm 22, as shown in FIG. 4, includes a series of upstanding teeth 21 of any desired size and spaced from each other any desired distance depending on the width of bars 40 and the desired air flow between the bars. Teeth 21 extend upwardly from the upper curved periphery of arm 22 for positioning the bars of sub-assembly $B_1$ or $B_2$ in their appropriate relative position. It is to be recognized that the surfaces $a$ of teeth 21 which face a direction away from the center or highest point $b$ of spacer arm 22 must be disposed at least vertically or preferably at a slight angle toward the center or highest point $b$ of spacer arm 22, so that the screen may be lifted from the jig 10 after the welding has been completed. Moreover, the upper edges $c$ of said spacer arm 22 between teeth 21 provides a support surface for bars 40 and thus, are preferably disposed in the same curved plane as horizontal ledges 15 on end members 18. It is to be recognized that ledges 15 may entirely support the bars 40 without the aid of edges $c$ on spacer arm 22, in which case edges $c$ are disposed in a curved plane below ledges 15 with teeth 21 extending upwardly to a point above the curved plane of ledges 15. Although the drawings and specification are directed to one size of spacer arm 22, it is to be recognized that other spacer arms with different dimensions may be substituted for arm 22 if different sized bars 40 are to be used.

Some screens use bars 40 that taper from the edge of said screen toward the central longitudinal axis as described in U.S. Pat. No. 3,348,268. Jig 10 may be modified to form bar sub-assemblies for such a screen by changing one of the spacer arms 22, so that the edges $c$ between teeth 21 are of greater length in one arm 22 than in the other.

Figure 3:
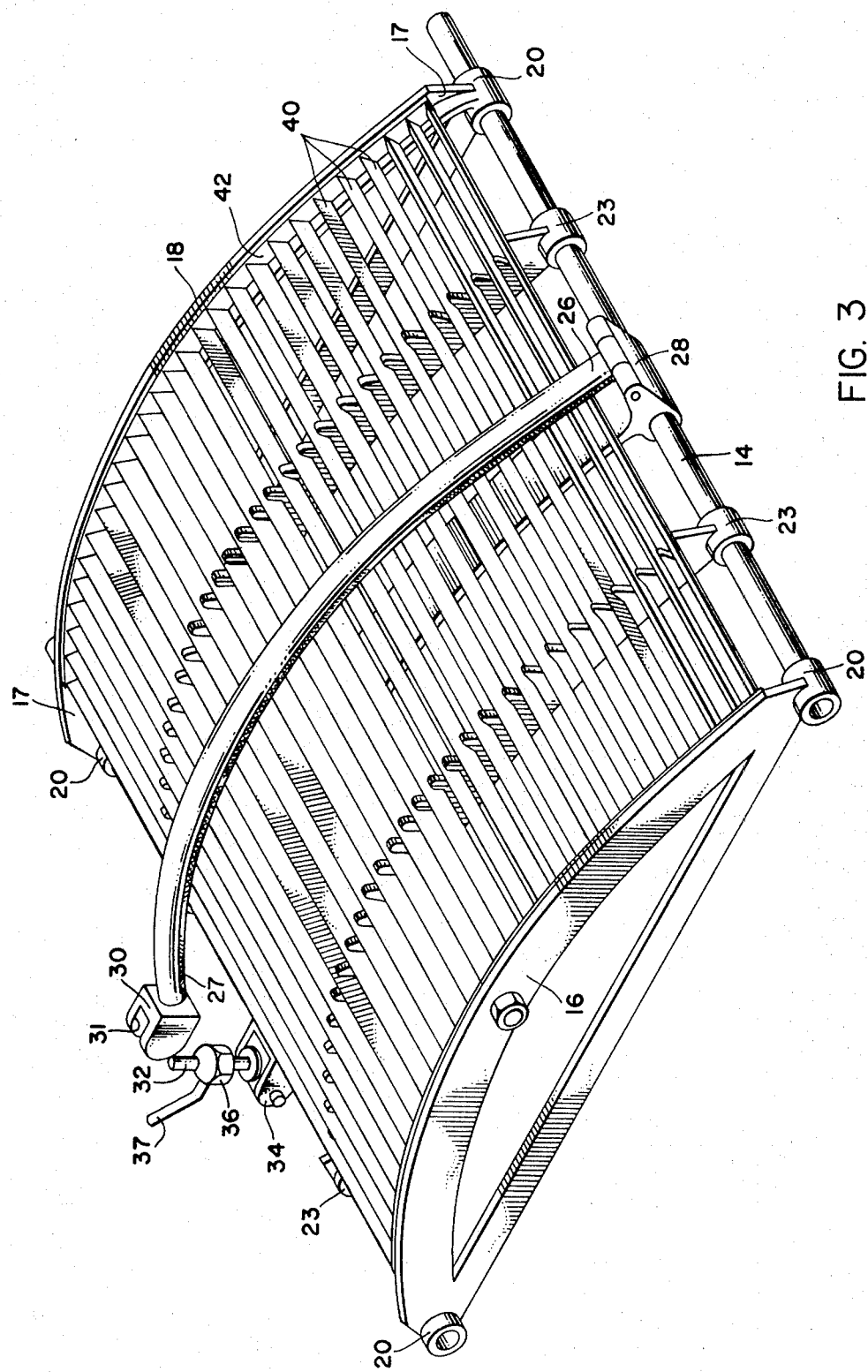
FIG. 3 is a perspective view of the bar subassembly jig shown in FIG. 2, and having the bars loaded therein preparatory for welding to a pair of end pieces.

Referring now to FIG. 3, jig 10 is prepared for receiving screen bars 40 by first releasing slotted coupling 30 from beneath fastening nut 36 and swinging bearing band 26 up and out of the way as shown in FIG. 2. End walls 42 are then positioned against the inner surface of vertical sides 17 of angular end members 16 and 18. Bars 40 are positioned between the raised teeth 21 so that the ends of each bar 40 rest on horizontal ledges 15 of end members 16 and 18 and abut end plates 42. Curved bearing band 26 is then lowered to its closed position and secured by tightening nut 36 into bearing relation with coupling 30.

The welding operation then proceeds and comprises tack welding or fillet welding all of the locations where bars 40 abut end walls 42. Upon completion of the welding operation, bearing band 26 is then loosened and swung up out of the way, the completed sub-assembly is removed from the jig and undergoes a straightening and sanding operation.

The bar sub-assembly $B_1$ or $B_2$ is then ready for assembly with the remaining components into a completed card screen. As shown in FIG. 5, the completed card screen also comprises a pair of end walls $E_1$ and $E_2$, a front plate P, and a central rib C. A bar sub-assembly $B_1$ is positioned between end wall $E_1$ and one side of central rib C, and bar sub-assembly $B_2$ extends between the other side of central rib C and the other end wall $E_2$. Front plate P is positioned between end walls $E_1$ and $E_2$ and adjacent the front edges of bar sub-assemblies $B_1$ and $B_2$. The above mentioned components are clamped securely together, and the bar sub-assemblies $B_1$ and $B_2$ and front plate P are spot-welded or riveted to the ribs $E_1$, $E_2$ and C. End plates 42 provide a surface for spot-welding or riveting the bar sub-assemblies $B_1$ and $B_2$ to each of the ribs. Although the embodiment described above is preferred, it should be recognized that plate P could be formed of two plates, each being associated with one bar sub-assembly.

It may also be possible to mold the bar sub-assembly $B_1$ or $B_2$ from a relatively hard plastic rather than forming the sub-assembly by the welding operation of metal elements described heretofore. In such a case, the method of uniting the bar sub-assembly with the other component parts of the screen is the same as described in the preceding paragraph, except, obviously the components must be riveted together or fastened by some other process not requiring the application of heat.

Some card screens comprise bars that extend completely from end rib $E_1$ to end rib $E_2$, omitting the central rib C. It is to be recognized that such a bar sub-assembly is within the scope of this invention, merely requiring a different spacing of the transverse members between longitudinal rods 12 and 14 of welding jig 10.

The number of bars in sub-assemblies $B_1$ and $B_2$ may vary according to the type of screen being fabricated, however, such variations may be accommodated in jig 10 by merely using in jig 10 only as many bars 40 as are required with an end plate 42 of corresponding length. The variations in the number of bars used will be compensated for during final assembly by a plate P of sufficient length to fill the remaining space between the bar sub-assembly and the end of the screen.

There is thus provided a method for fabricating a card screen and a welding jig for fabricating a sub-assembly for the jig. The method includes first building bar sub-assemblies, and then securing the bar sub-assemblies to the remainder of the elements of the card screen, eliminating tack welding or fillet welding during the final assembly stage, thus reducing a considerable amount of the straightening and sanding operations previously necessary.

Various other modifications of the invention will be apparent to those skilled in the art, and it is to be understood that those modifications can be made without departing from the scope of the invention, if they are within the spirit of the accompanying claims.

We claim:

1. A welding jig adapted to support during assembly components of a bar sub-assembly useful in a card screen including a series of bars and a pair of end walls; said jig comprising:

a. a pair of parallel, spaced end members, each of said end members being longitudinally curved in a path approximately equal to the curved path of said card screen and including a first means for retaining said end walls in their proper, horizontally spaced relation and a second means for supporting the ends of said series of bars;

b. at least one spacer arm disposed between and parallel to said end members, said spacer arm comprising a series of upstanding teeth for spacing the bars of said sub-assembly from one another, and said divider arm extending in a curved path approximately equal to the curve in said card screen; and c. a bearing means exerting a downward force on said bars for retaining them in their relative position preparatory to the welding operation.

2. The welding jig according to claim 1 wherein said first means for retaining said end walls in their proper, horizontally spaced relation comprises a vertical wall extending the length of each of said end members, and said second means for supporting the ends of said series of bars comprises a horizontal ledge extending the length of each of said end members, said ledge extending in a curved path approximately equal to the curve in said card screen.

3. The welding jig according to claim 1 wherein said end members, said spacer arm, and said bearing means each include an integral sleeve at each end thereof for securing said members at prescribed locations along a pair of spaced parallel rod members, said sleeves on each of said parallel rod members being adjustable relative to each other.

4. The welding jig according to claim 1 wherein said bearing means comprises a hinged, curved bearing band extending in a curved path approximately equal to the curve in said card screen, said band being selectively movable between a position out of bearing relation to said bars and a position in bearing relation to said bars.

* * * * *